US008248048B2

(12) United States Patent
Lin

(10) Patent No.: US 8,248,048 B2
(45) Date of Patent: Aug. 21, 2012

(54) STANDBY POWER SUPPLY CIRCUIT

(75) Inventor: Ho-Feng Lin, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 241 days.

(21) Appl. No.: 12/818,182

(22) Filed: Jun. 18, 2010

(65) Prior Publication Data

US 2011/0254522 A1    Oct. 20, 2011

(30) Foreign Application Priority Data

Apr. 14, 2010   (TW) ................................ 99111542 A

(51) Int. Cl.
G05F 1/00         (2006.01)
G05F 1/613       (2006.01)

(52) U.S. Cl. ......................... 323/271; 323/224; 323/284

(58) Field of Classification Search ................. 323/224, 323/225, 271, 282, 284, 285, 351
See application file for complete search history.

(56) References Cited

U.S. PATENT DOCUMENTS

| 5,592,071 | A  | * | 1/1997  | Brown ........................... 323/282 |
| 8,049,473 | B2 | * | 11/2011 | Hu ................................. 323/271 |
| 2004/0207459 | A1 | * | 10/2004 | Farkas et al. ................... 327/536 |
| 2010/0211811 | A1 | * | 8/2010 | Zhou et al. ..................... 713/330 |

* cited by examiner

Primary Examiner — Gary L Laxton
Assistant Examiner — Zekre Tsehaye
(74) Attorney, Agent, or Firm — Altis Law Group, Inc.

(57) ABSTRACT

A standby power supply circuit includes a pulse width modulation controller, first to fourth metal-oxide-semiconductor field effect transistors (MOSFETs), and an inductor. A gate of the first MOSFET and a gate of the second MOSFET are connected to a first and a second general purpose terminals of a power management chip, respectively. A drain of the first MOSFET is connected to a source of the third MOSFET. A gate of the fourth MOSFET is connected to a lower gate terminal of the controller. A phase terminal of the controller is grounded via the inductor and a capacitor in series. The drain of the second MOSFET is connected to a node between the inductor and the capacitor via a resistor.

7 Claims, 1 Drawing Sheet

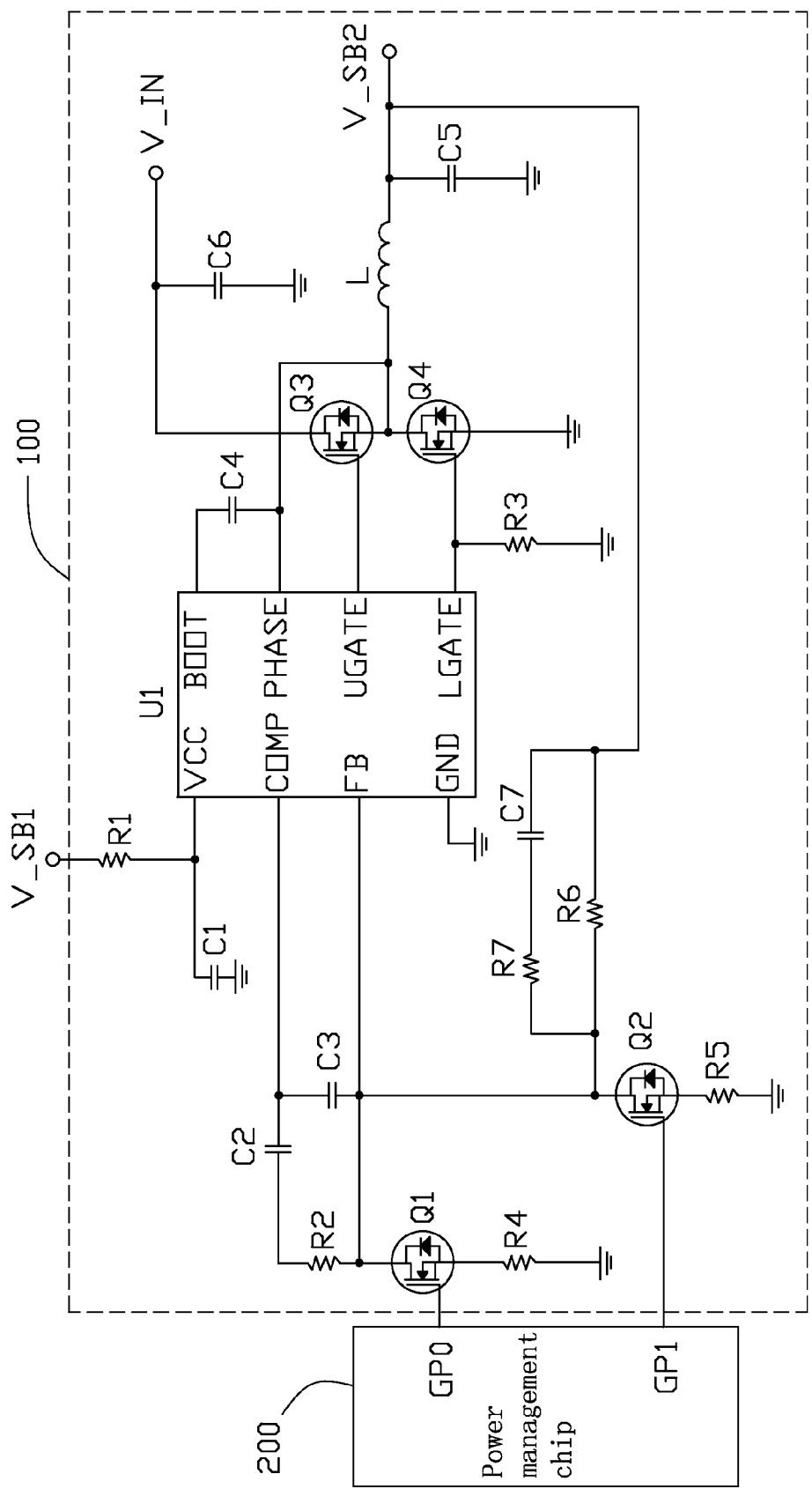

STANDBY POWER SUPPLY CIRCUIT

BACKGROUND

1. Technical Field

The present disclosure relates to a standby power supply circuit.

2. Description of Related Art

The voltage range of the 3.3 volt (V) standby power of a computer is 3.3V±5%. In other words, the voltage range of the 3.3V standby power is 3.465V~3.135V. After the computer is powered on, the voltage of the 3.3 V standby power need only to be about 3.135V. However, a conventional standby power supply circuit cannot reduce the 3.3 V standby power to 3.135V, thus power is wasted.

BRIEF DESCRIPTION OF THE DRAWING

Many aspects of the present embodiments can be better understood with reference to the following drawing. The components in the drawing are not necessarily drawn to scale, the emphasis instead being placed upon clearly illustrating the principles of the present embodiments. Moreover, in the drawing, all the views are schematic, and like reference numerals designate corresponding parts throughout.

The drawing is a circuit diagram of an exemplary embodiment of a standby power supply circuit.

DETAILED DESCRIPTION

The disclosure, including the accompanying drawings is illustrated by way of example and not by way of limitation. It should be noted that references to "an" or "one" embodiment in this disclosure are not necessarily to the same embodiment, and such references mean at least one.

Referring to the drawing, an exemplary embodiment of a standby power supply circuit 100 includes a pulse width modulation (PWM) controller U1, a first metal-oxide-semiconductor field effect transistor (MOSFET) Q1, a second MOSFET Q2, a third MOSFET Q3, a fourth MOSFET Q4, an inductor L, resistors R1-R7, and capacitors C1-C7. In one embodiment, the first to fourth MOSFETs Q1-Q4 are n-channel MOSFETs.

The PWM controller U1 includes a power terminal VCC, a ground terminal GND, a compensation terminal COMP, a feed back terminal FB, a booting terminal BOOT, a phase terminal PHASE, an upper gate terminal UGATE, and a lower gate terminal LGATE.

The power terminal VCC of the PWM controller U1 is connected to a 5 volt (V) standby power source V_SB1 via the resistor R1, and is grounded via the capacitor C1. The compensation terminal COMP is connected to a drain of the first MOSFET Q1 via the capacitor C2 and the resistor R2, which are connected in series. The feed back terminal FB is connected to the compensation terminal COMP via the capacitor C3, and connected to the drain of the first MOSFET Q1. The ground terminal GND is grounded. The booting terminal BOOT is connected to the phase terminal PHASE via the capacitor C4. The phase terminal PHASE is connected to a first terminal of the capacitor C5 via the inductor L. A second terminal of the capacitor C5 is grounded. The upper gate terminal UGATE is connected to a gate of the third MOSFET Q3. The lower gate terminal LGATE is connected to a gate of the fourth MOSFET Q4, and grounded via the resistor R3. A node between the inductor L and the capacitor C5 outputs a standby power V_SB2.

A drain of the third MOSFET Q3 is connected to a power source V_in, and grounded via the capacitor C6. A source of the third MOSFET Q3 is connected to the phase terminal PHASE of the PWM controller U1.

A drain of the fourth MOSFET Q4 is connected to the source of the third MOSFET Q3. A source of the fourth MOSFET Q4 is grounded.

A gate of the first MOSFET Q1 is connected to a first general purpose terminal GP0 of a power management chip 200. A source of the first MOSFET Q1 is grounded via the resistor R4.

A drain of the second MOSFET Q2 is connected to the drain of the first MOSFET Q1. A gate of the second MOSFET Q2 is connected to a second general purpose terminal GP1 of the power management chip 200. A source of the second MOSFET Q2 is grounded via the resistor R5.

The resistor R6 is connected between the drain of the second MOSFET Q2 and the node between the inductor L and the capacitor C5.

A first terminal of the resistor R7 is connected to the drain of the second MOSFET Q2. A second terminal of the resistor R7 is connected to a first terminal of the capacitor C7. A second terminal of the capacitor C7 is connected to the node between the inductor L and the capacitor C5. In one embodiment, the resistance of the resistor R4 is 2.00 kilo ohms (KΩ), the resistance of the resistor R5 is 2.14 KΩ, the resistance of the resistor R6 is 9.09 KΩ.

The PWM controller U1 controls the third MOSFET Q3 and the fourth MOSFET Q4 to turn on or off.

When the upper gate terminal UGATE of the PWM controller U1 is at a high voltage level and the lower gate terminal LGATE of the PWM controller U1 is at a low voltage level, the third MOSFET Q3 is turned on and the fourth MOSFET Q4 is turned off. The node between the inductor L and the capacitor C5 outputs a 3.3V standby power V_SB2. The power source V_in charges the capacitor C5 via the third MOSFET Q3 and the inductor L.

When the upper gate terminal UGATE of the PWM controller U1 is at a low voltage level and the lower gate terminal LGATE of the PWM controller U1 is at a high voltage level, the third MOSFET Q3 is turned off and the fourth MOSFET Q4 is turned on. The node between the inductor L and the capacitor C5 continues outputting the standby power V_SB2 because the voltage across the inductor L cannot quickly change.

When the first MOSFET Q1 is turned on and the second MOSFET Q2 is turned off, the relationship of the voltage of the standby power V_SB2, an internal reference voltage V-ref, and the resistances of the resistor R4 and R6 is as follows:

$$V\_SB2 = V\text{-refx}\,(R6+R4)/R4, \text{ wherein the value of the internal reference voltage V-ref is 0.6V.}$$

When the first MOSFET Q1 is turned off and the second MOSFET Q2 is turned on, the relationship of the voltage of the standby power V_SB2, the internal reference voltage V-ref, and the resistances of the resistor R4 and R5 is as follows:

$$V\_SB2 = V\text{-refx}\,(R6+R5)/R5$$

Before the computer is powered on, the first general purpose terminal GP0 of the power management chip 200 is at a high voltage level, and the second general purpose terminal GP1 of the power management chip 200 is at a low voltage level. The first MOSFET Q1 is turned on and the second MOSFET Q2 is turned off. The voltage of the standby power V_SB2 is 3.327V.

After the computer is powered on, the first general purpose terminal GP0 of the power management chip 200 is at a low voltage level, and the second general purpose terminal GP1 of the power management chip 200 is at a high voltage level. The first MOSFET Q1 is turned off and the second MOSFET Q2 is turned on. The voltage of the standby power V_SB2 is about 3.149V.

The foregoing description of the exemplary embodiments of the disclosure has been presented only for the purposes of illustration and description and is not intended to be exhaustive or to limit the disclosure to the precise forms disclosed. Many modifications and variations are possible in light of the above everything. The embodiments were chosen and described in order to explain the principles of the disclosure and their practical application so as to enable others of ordinary skill in the art to utilize the disclosure and various embodiments and with various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than the foregoing description and the exemplary embodiments described therein.

What is claimed is:

1. A standby power supply circuit, comprising:
   a pulse width modulation (PWM) controller comprising a power terminal, a ground terminal, a compensation terminal, a feed back terminal, a booting terminal, a phase terminal, an upper gate terminal, and a lower gate terminal, wherein the power terminal of the PWM controller is connected to a first power source, the feed back terminal is connected to the compensation terminal via a first capacitor, the ground terminal is grounded, the booting terminal is connected to the phase terminal via a second capacitor;
   a first metal-oxide-semiconductor field effect transistor (MOSFET), wherein a drain of the first MOSFET is connected to the feed back terminal of the PWM controller, a gate of the first MOSFET is connected to a first general purpose terminal of a power management chip, a source of the first MOSFET is grounded via a first resistor;
   a second MOSFET, wherein a drain of the second MOSFET is connected to the drain of the first MOSFET, a gate of the second MOSFET is connected to a second general purpose terminal of the power management chip, a source of the second MOSFET is grounded via a second resistor;
   a third MOSFET, wherein a drain of the third MOSFET is connected to a second power source, a gate of the third MOSFET is connected to the upper gate terminal of the PWM controller, a source of the third MOSFET is connected to the phase terminal of the PWM controller;
   a fourth MOSFET, wherein a drain of the fourth MOSFET is connected to the source of the third MOSFET, a gate of the fourth MOSFET is connected to the lower gate terminal of the PWM controller, a source of the fourth MOSFET is grounded;
   an inductor, wherein the phase terminal of the PWM controller is connected to a first terminal of a third capacitor via the inductor, a second terminal of the third capacitor is grounded, the drain of the second MOSFET is connected to a node between the inductor and the third capacitor via a third resistor, the node between the inductor and the third capacitor outputs a standby power.

2. The standby power supply circuit of claim 1, wherein the PWM controller is an ISL6545 PWM controller.

3. The standby power supply circuit of claim 1, wherein the resistance of the first resistor is 2.00 kilohms (KΩ), the resistance of the second resistor is 2.14 KΩ, the resistance of the third resistor is 9.09 KΩ.

4. The standby power supply circuit of claim 1, wherein the power terminal of the PWM controller is grounded via a fourth capacitor.

5. The standby power supply circuit of claim 1, wherein the compensation terminal of the PWM controller is connected to the drain of the first MOSFET via a fourth capacitor and a fourth resistor in series.

6. The standby power supply circuit of claim 1, wherein the lower gate terminal of the PWM controller is grounded via a fourth resistor.

7. The standby power supply circuit of claim 1, further comprising a fourth resistor and a fourth capacitor, wherein a first terminal of the fourth resistor is connected to the drain of the second MOSFET, a second terminal of the fourth resistor is connected to a first terminal of the fourth capacitor, a second terminal of the fourth capacitor is connected to the node between the inductor and the third capacitor.

* * * * *